United States Patent [19]
Swenson

[11] 4,014,507
[45] Mar. 29, 1977

[54] SEAT SUPPORTING ASSEMBLY

[75] Inventor: Richard F. Swenson, Milwaukee, Wis.

[73] Assignee: Milsco Manufacturing Company, Milwaukee, Wis.

[22] Filed: Jan. 12, 1976

[21] Appl. No.: 648,137

[52] U.S. Cl. .............................. 248/407; 248/416; 248/418; 248/425; 248/354 P
[51] Int. Cl.² .................. F16M 11/00; F16M 13/00
[58] Field of Search .......... 248/157, 161, 407, 415, 248/416, 418, 419, 423, 424, 425, 429, 188.5, 354 P; 296/65 R; 297/345, 346, 349

[56] References Cited
UNITED STATES PATENTS

| | | | |
|---|---|---|---|
| 1,278,729 | 9/1918 | O'Dell | 297/345 X |
| 2,312,030 | 2/1943 | Cramer et al. | 248/418 X |
| 2,409,114 | 10/1946 | Elleman et al. | 248/425 |
| 2,412,750 | 12/1946 | Raitch | 248/416 |
| 2,906,490 | 9/1959 | Russell | 248/354 P |
| 3,437,373 | 4/1969 | Boston | 296/65 R |
| 3,740,014 | 6/1973 | Swenson et al. | 248/429 X |
| 3,926,396 | 12/1975 | Hall et al. | 297/349 X |

FOREIGN PATENTS OR APPLICATIONS

| | | | |
|---|---|---|---|
| 818,911 | 7/1969 | Canada | 248/415 |
| 1,331,930 | 6/1963 | France | 248/424 |
| 220,166 | 3/1942 | Switzerland | 248/407 |
| 690,025 | 4/1953 | United Kingdom | 248/418 |

Primary Examiner—Lawrence J. Staab
Attorney, Agent, or Firm—James E. Nilles

[57] ABSTRACT

A seat supporting assembly for use in vehicles such as tractors or the like wherein the seat is surrounded in relatively close relationship by obstructions such as controls which make it difficult for the vehicle operator to get into and out of the seat. The seat supporting assembly provides means for supporting the vehicle seat such that the seat may be moved rearwardly and then rotated to permit access to or egress from the seat. The assembly also provides means which prevent rotation of the seat unless it has been moved to its furthest rearward position. The seat supporting assembly further includes means to facilitate vertical adjustment of the seat and to secure the seat in its desired vertical position.

7 Claims, 9 Drawing Figures

SEAT SUPPORTING ASSEMBLY

BACKGROUND OF THE INVENTION

The present invention relates to means for supporting seats used in mobile vehicles such as tractors and more particularly to means which facilitate access by a vehicle operator to a seat which is positioned in relatively close relationship to obstructions around the seat.

In vehicles such as tractors, the operator's seat may be surrounded in relatively close relationship by obstructions such as controls and the like which make it difficult or the operator to get into and out of the seat since these obstructions prevent free movement of his legs. It is desirable, therefore, that the seat be movable from an operating position to a position which facilitates access thereto by the vehicle operator.

SUMMARY OF THE INVENTION

The present invention provides an improved means for supporting a vehicle seat which permits the seat to be moved in a rearward direction and then rotated whereby the operator positioned in the seat can move away from control instruments and other obstructions such that he is free to leave the seat. The invention further includes means which also permit the seat to be releaseably locked in place when the seat is in its forward operating position. An improved means is also provided to facilitate vertical adjustment of the position of the seat and to securely lock the seat in the desired vertical position.

The apparatus of the invention generally comprises a seat supporting assembly which includes a forwardly and rearwardly movable carriage which supports the seat. The carriage is mounted on a pair of shafts which are in turn slideably supported for reciprocating forward and rearward movement by guide means secured to a rotatable frame. The rotatable frame includes a sleeve which is rotatably supported on a rigid vertically extending shaft or pedestal secured to the vehicle frame. A selectively operable latch means is also provided which prohibits rotational movement of the rotatable frame except when the carriage supporting the seat has been slideably moved to a fully rearwardly retracted position. The selectively operable latch means comprises a rigid member secured to the vertically extending shaft and a swingable assembly which is normally biased into notched engagement with the rigid member such that the rotatable support frame is prevented from rotatable movement by the rigid member. The carriage includes a projection which is positioned to engage the swingable latch member when the frame has been moved to its fully retracted position and thereby causing disengagement of the swingable latch assembly and the rigid latch member thus permitting rotation of the vehicle seat. The projection does not disengage the swingable latch member, however, until the frame has been fully retracted.

The seat supporting assembly of the present invention also provides improved means for permitting vertical adjustment of the seat. The vertically extending shaft is provided with a plurality of horizontally extending bores therethrough and a pin is slideably receivable in the bores such that its opposite ends project from the bores. These ends of the pin support a washer which in turn supports the rotatable sleeve which is positioned around the vertically extending shaft. The washer is provided with a downwardly extending peripheral lip for engaging the opposite ends of the pin to prohibit the pin from sliding out of the bore. The vertical position of the seat can be readily adjusted, however, by sliding the rotatable sleeve and the washer upwardly to permit repositioning of the pin in another of the bores.

DESCRIPTION OF THE PREFERRED EMBODIMENT

Figure 1:
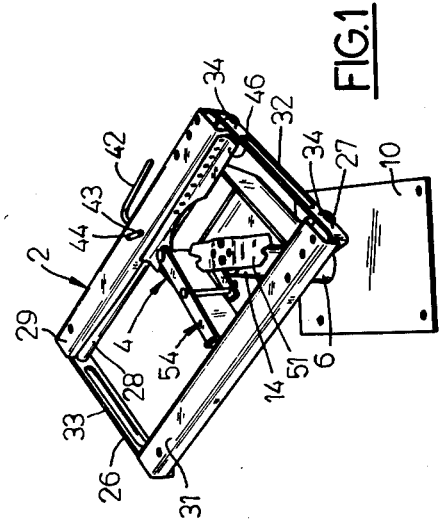
FIG. 1 is a perspective view of the seat supporting assembly of the present invention.
Figure 3:
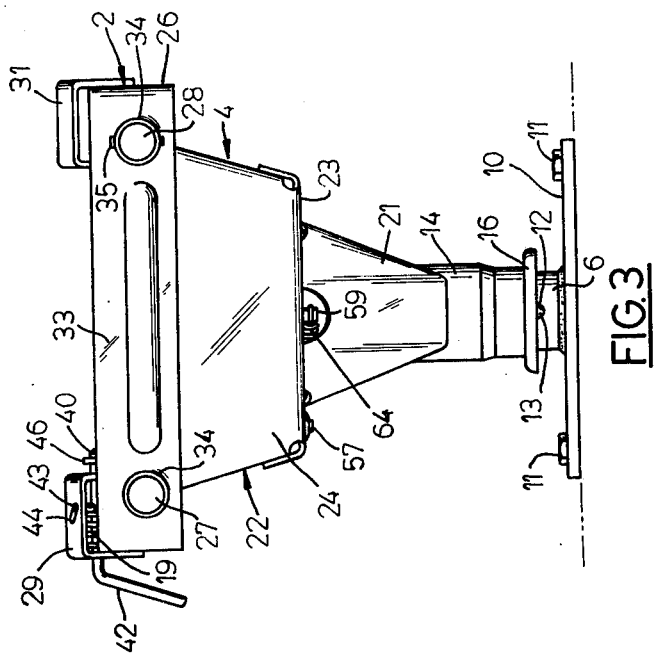
FIG. 3 is an end elevation view of the seat supporting assembly shown in FIG. 2.

The seat supporting assembly of the present invention is generally comprised of a seat supporting carriage 2, a rotatable supporting frame 4 and a rigid vertically extending support shaft 6. The rigid vertically extending support shaft 6 rotatably supports the rotatable supporting frame 4, and the rotatable supporting assemby 4 in turn supports the seat supporting carriage 2 in such a manner as to permit generally horizontal sliding reciprocating movement of the carriage and of the seat 8 supported thereon.

More specificaly, the structure of the seat supporting assembly of the invention is comprised of a base plate 10 which can be bolted by means of bolts 11 to a supporting surface of a vehicle such as a tractor or the like. The vertically positioned support shaft 6 is welded to the base plate 10 and is thus rigidly supported. The support shaft 6 includes a plurality of horizontally extending bores 12 through its lower portions and spaced in generally vertical relationship. The bores 12 are designed to receive a pin 13 which has a length somewhat greater than the diameter of the shaft 6 such that the ends of the pin 13 can extend outwardly from opposite sides of the shaft. The purpose of the pin 13 is to support a rotatable sleeve 14 which is received around the shaft 6 and is freely rotatable therewith. A cup washer or disc 16 on the shaft 6 is positioned between the lower end of the rotatable sleeve 14 and rests upon the pin 13. The washer 16 includes a generally downwardly extending peripheral lip 17 which is received against opposite ends of the pin 13 to prevent the pin from axial movement within the horizontal bores 12. By moving the rotatable sleeve 14 and the washer 16 upwardly, however, the pin 13 can be removed and placed in another of the various bores 12 to provide for vertical adjustment of the seat 8.

Figure 5:
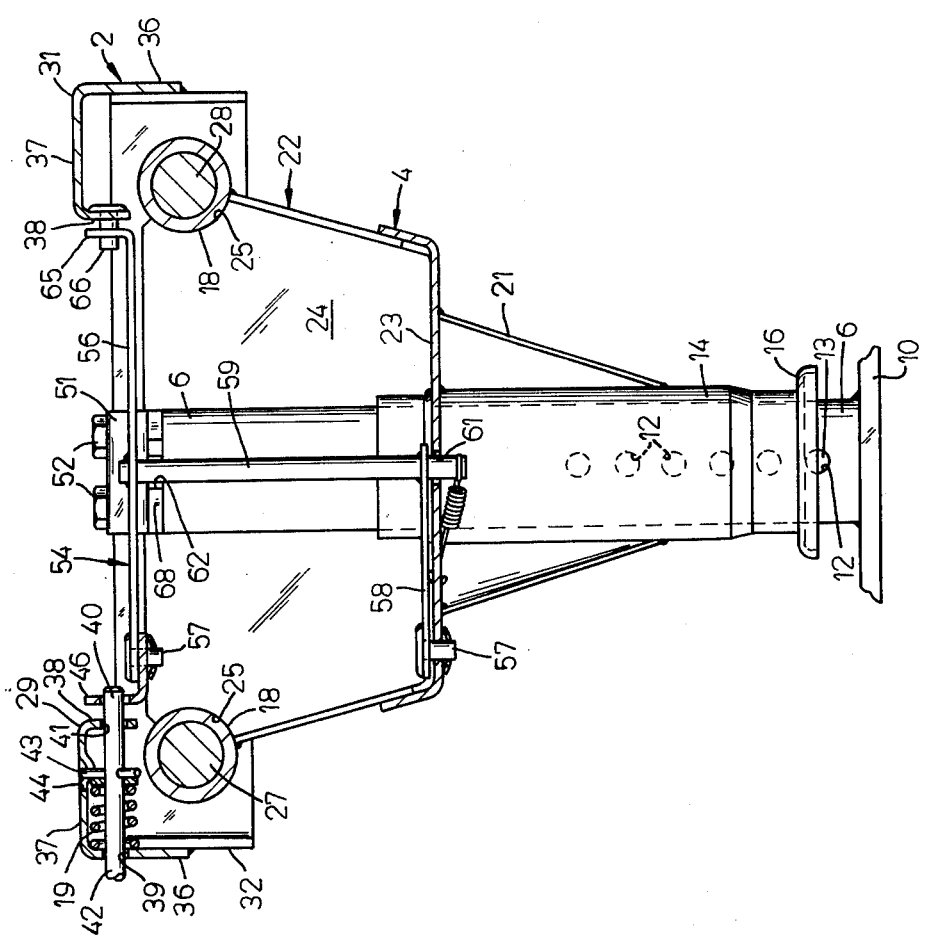
FIG. 5 is an enlarged partial cross-sectional end view of the seat supporting assembly shown in FIG. 3.
Figure 4:
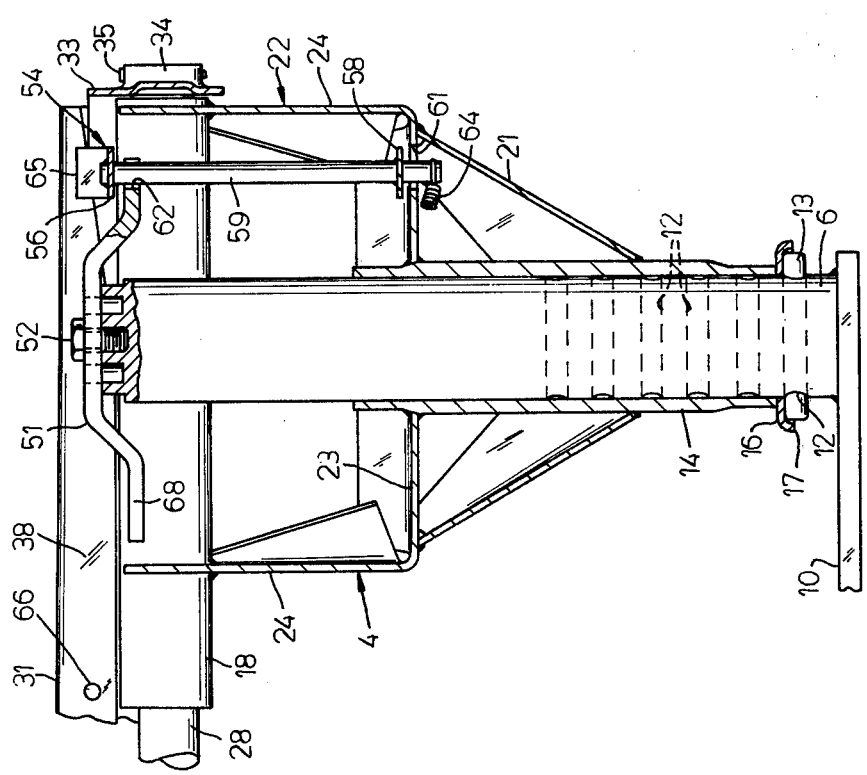
FIG. 4 is an enlarged partial cross-sectional side view of the seat supporting assembly shown in FIG. 2

The rotatable seat sporting frame 4 is generally comprised of the rotatable sleeve 14, a pair of horizontally extending parallel guide tubes 18 and a guide tube support assembly. The structure of the guide tube support assembly is best shown in FIGS. 2–5 and includes a guide tube supporting frame 22 welded to the rotatable sleeve 14 and a pair of curved brace members 21 welded to the rotatable sleeve 14 at their lower ends and welded to the bottom of the frame 22 at their upper ends. The guide tube supporting frame 22 is comprised of a bottom wall 23 including a bore for receiving the upper portion of the rotatable sleeve 14, and a pair of integrally connected upwardly extending parallel opposed walls 24 for supporting the guide tubes 18 therebetween. Opposite ends of the guide tubes 18 are received within concave indentations 25 in the outer upper corners of the upwardly extending opposed walls 24, as shown in FIG. 5, and are welded thereto such that they are rigidly secured. The guide tubes 18 function to receive an slideably support a pair of parallel horizontal fore and aft extending shafts 27 and 28 which comprise part of the seat supporting carriage 2.

Figure 6:
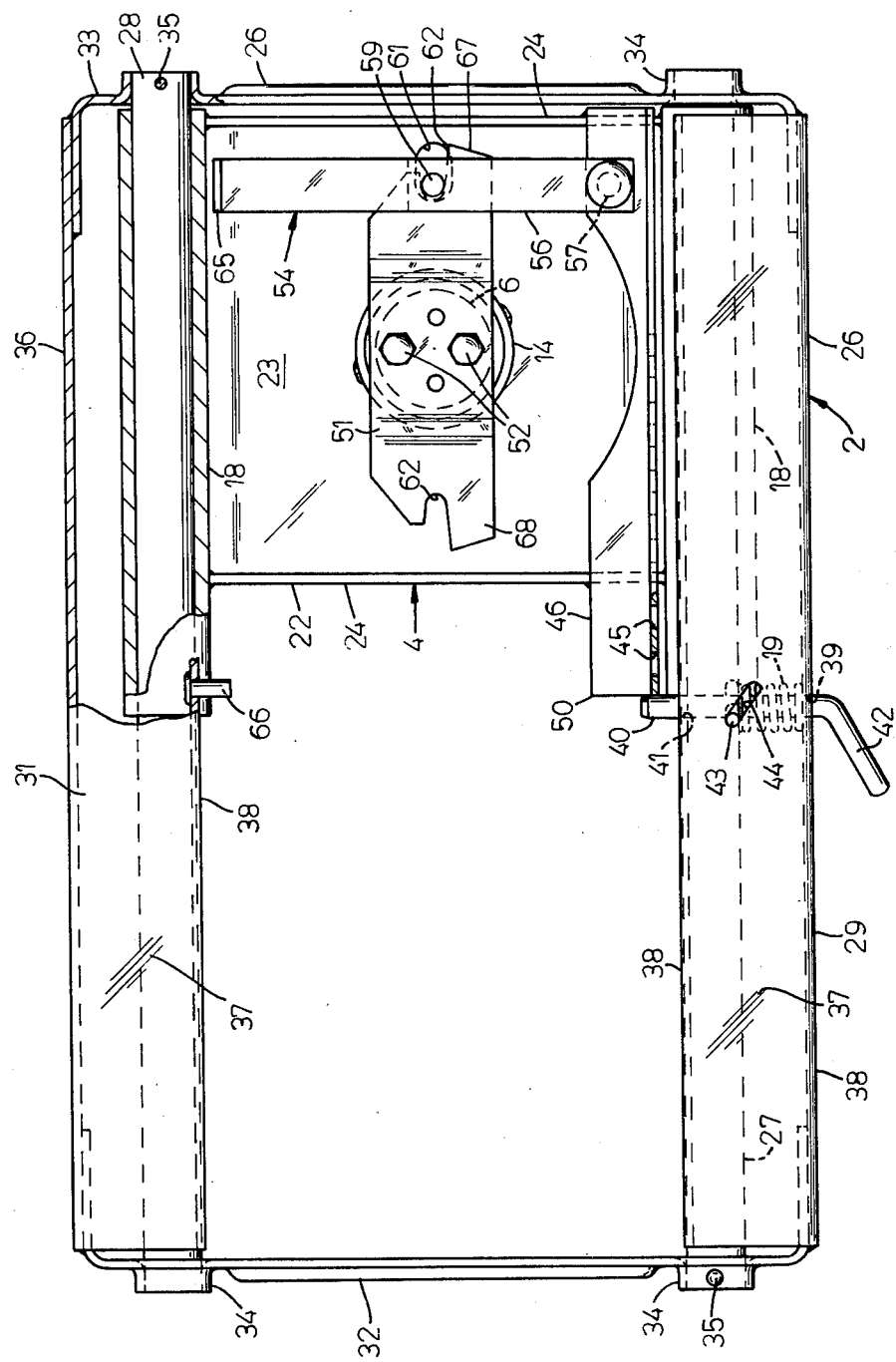
FIG. 6 is a plan view of the seat supporting assembly shown in FIGS. 1-5 and partially cut-away in the interest of clarity.

The seat supporting carriage 2 is generally comprised of a rectangular generally horizontal frame 26 supported by the shafts 27 and 28 which are slideably receivable in the guide tubes 18. The frame 26 is comprised of a pair of longitudinally extending elongated channels or rails 29 and 31 which support opposite sides of the seat 8. The opposite ends of each of the channels 29 and 31 are rigidly secured to laterally extending shaft supporting members 32 and 33. The shaft supporting member 32 and 33 each include shaft receiving sleeves 34 for supporting opposite ends of the shafts 27 and 28. Pins 35 are received through bores in the shaft receiving sleeves 34 and through the ends of shafts 27 and 28 to rigidly secure the shafts 27 and 28 with respect to the seat supporting frame 26. As best shown in FIG. 5, the elongated channels 29 and 31 each include an outer wall portion 36, a top wall 37 and an inside wall portion 38. The channel 29 also includes aligned bores 39 and 41 in its respective walls 36 and 38 which receive a laterally inwardly extending end 40 of an angular shaped lever 42. A pin 43 extends laterally through the lever end 40 and is received within a diagonally extending slot 44. As can be seen in FIG. 6, rotation of the lever 42 will cause the pin 43 to move diagonally along the slot 44 and thus cause generally outward movement of the lever end 40. The inwardly extending end 40 of the lever 42 is biased inwardly by a spring 19 which is compressed between the wall portion 36 and the pin 43, and is designed to be received in abutting relationship against the forward end surface 50 of an angular longitudinally extending stop member 46 which is secured to the upper surfaces of the respective walls 24. It is readily apparent that when the lever 42 is in the position shown in FIG. 6, the frame assembly 2 is restricted against rearward movement, i.e., movement to the right. The angular stop member 46 also includes a plurality of spaced bores 45 for receiving the end 40 of lever 42 to permit variable positioning of the seat 8 as desired by the vehicle operator.

A rigid angular latch member 51 is bolted by bolts 52 to the upper end of the support shaft 6. The latch member 51 is non-rotatable and is designed to function in conjunction with a swingable latch member 54 to prohibit pivotal or rotational movement of the seat support frame 4 around the shaft 6 except when the seat 8 has been moved rearwardly to its extreme position as will be described. The swingable latch member 54 is comprised of an upper latch arm 56 pivotably mounted by a latch pivot pin 57 to the angular stop member 46. The swingable latch member 54 also includes a lower latch support arm 58 operably connected to the latch arm 56 by a vertically extending latch shaft 59. The vertically extending latch shaft 59 is welded to the outer end of the latch support arm 58 and to a point intermediate the ends of the upper latch arm 56. Like the upper latch arm 56, the lower latch arm is pivotably mounted at one end by a latch pivot pin 57 extending through a bore in the bottom plate 23. The lower end of the vertical latch shaft 59 is received within a longitudinally extending shaft receiving slot 61 in the bottom wall 23 to provide for limited swingable movement of the pivotable latch member 54. The upper end of the vertical latch shaft 59 is received within a generally U-shaped notch 62 in the end of the latch member 51. When the pivotal latch member 54 is positioned, as shown in FIG. 6, the vertical latch shaft 59 is seated in the notch 62 so as to prevent pivotal movement of the vehicle seat 8. The pivotable latch member 54 is biased into engagement with the latch member 51 by means of a spring 64 secured at one end to the lower end of the shaft 59 and at its other end to the frame 22.

Figure 2:
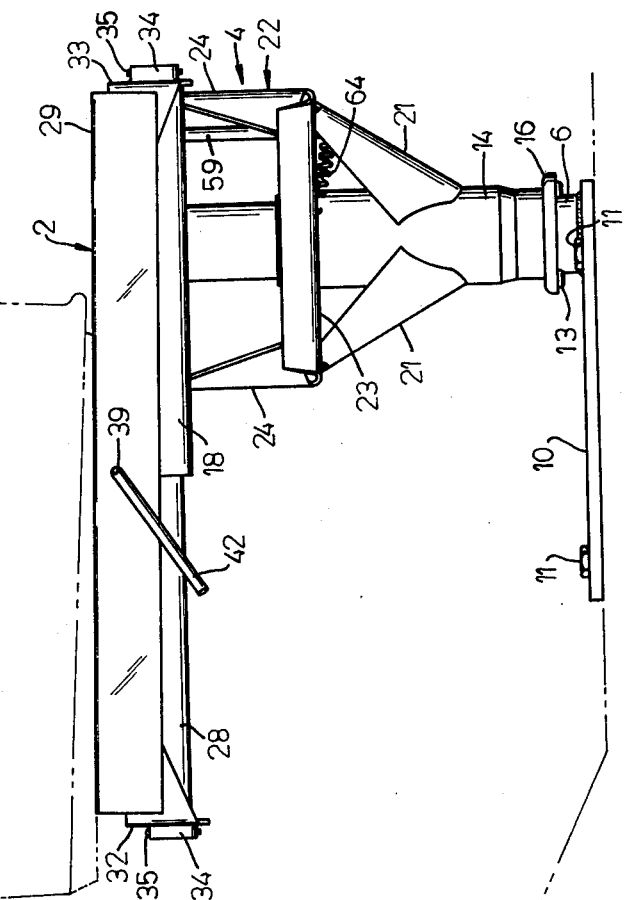
FIG. 2 is a side elevation view of the seat supporting assembly shown in FIG. 1 and showing the vehicle seat in its forward operating position.
Figure 7:
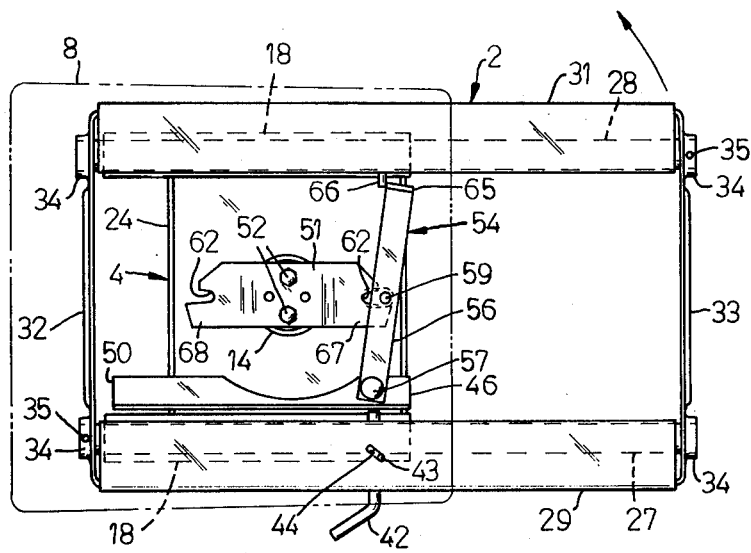
FIG. 7 is a plan view similar to that shown in FIG. 6 but showing the seat supporting assembly in its fully retracted position with the latch means disengaged to permit rotation.
Figure 8:
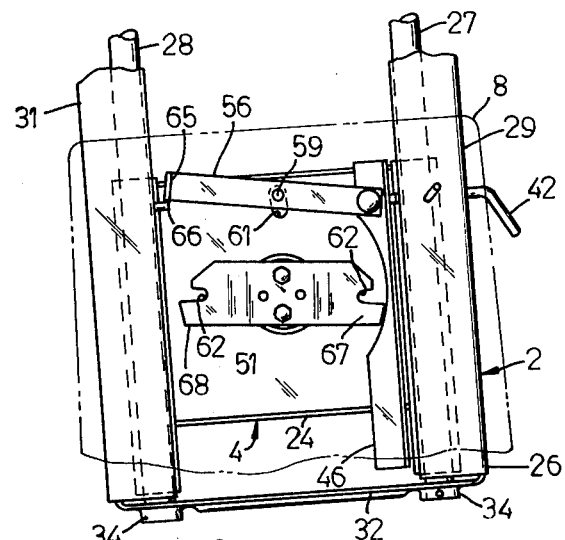
FIG. 8 is a partial view of that shown in FIG. 7 and showing the seat supporting assembly during rotation.
Figure 9:
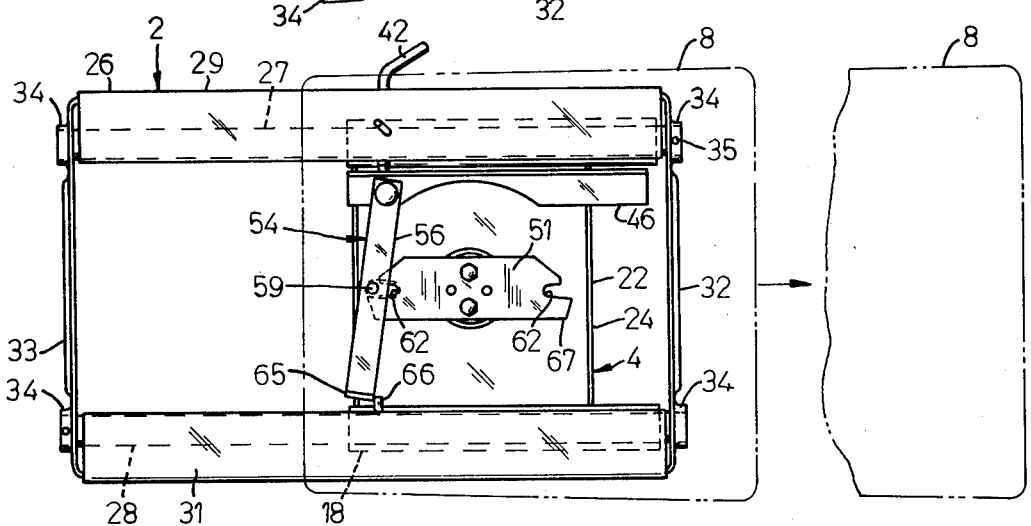
FIG. 9 is a view similar to FIGS. 7 and 8 but showing the seat supporting assembly in a position wherein the seat has been rotated 180° relative to the seat position in FIG. 7.

When the seat is in the position shown in FIGS. 2–6, and it is desired that the seat be moved to permit the operator to get out of the seat, the operator can pull up on lever 42 moving it in a generally clockwise direction. Clockwise movement of the lever 42 causes the pin 43, received in slot 44, to move the lever 42 in an outward direction, as will be seen from FIGS. 5–6. Such movement of the lever 42 outwardly, permits the seat and the seat supporting frame 26 to be moved rearwardly (or to the right as seen in FIGS. 2 and 6) with respect to the rotatable supporting frame 4 to the position shown in FIG. 7. When the seat supporting frame 26 has moved to its rearward position, a projecting pin 66 which is secured to the inside wall 38 of the angle 31 will abut against the outwardly extending end 65 of the latch arm 56 to cause pivotal movement of the pivotal latch arm 54. As shown in FIGS. 7, the vertical latch shaft 59 will thus be removed from the notch 62 to permit rotation of the rotatable seat supporting assembly about the supporting shaft 6, as shown in FIGS. 7 and 8. The rotational movement of the support frame 4 is limited to 180° by abutment of the vertical latch shaft 59 against one of the projections 67 or 68 extending from opposite ends of the latch member 51.

Resume

The present invention thus provides a means for supporting a vehicle seat which permits the seat to be retractable and pivotal to facilitate access to the seat. The invention also restricts pivotal movement of the seat except when the seat has been moved to its rearwardmost position and provides means to lock the seat in position during operation. The present invention also provides a simplified and improved means for facilitating vertical adjustment and provides means to insure that the vertical position of the seat will be secured.

I claim:

1. A seat assembly for a mobile vehicle and for rotatably and slideably supporting a seat, said assembly comprising:

a carriage for supporting said seat;

a rigid, stationary and generally vertical shaft securable to said vehicle;

a support frame rotatably supported by said shaft and vertically slideable on said shaft, said carriage slideably mounted on said frame for reciprocating movement relative thereto and between fore and aft positions; and latch means for selectively preventing rotational movement of said support frame with respect to said shaft and operably connected between said shaft and said support frame and a releasing member operably connected to and carried by said carriage for disengaging said latch means when said carriage is moved to said aft position thereby permitting rotational movement of said support frame after said carriage has been slid to said aft position, said latch means including a stationary latch member fixed to said vertical shaft and a shiftable latch member including a swingable member pivotably supported by said frame, and an elongated latch shaft positioned vertically and supported by said swingable member for swingable movement about a vertical axis spaced from said elongated latch shaft for engagement with said stationary latch member.

2. The seat assembly set forth in claim 1 wherein said support frames includes parallel spaced guide tubes and wherein said carriage includes parallel shaft members slideably supported by said guide tubes whereby said carriage is supported by said support frame for said reciprocating movement.

3. The seat assembly set forth in claim 1 wherein said support frame includes a sleeve rotatably received on said shaft and a pair of guides supported by said sleeve and in spaced parallel relationship, said guides supporting said carriage for slideable reciprocating movement.

4. The seat assembly set forth in claim 3 wherein said carriage includes shaft members slideably supported by said guides.

5. The seat assembly set forth in claim 2 wherein said carriage further includes a frame assembly supported by said parallel shaft members and supporting said seat, and a selectively engageable stop means engageable with said support frame to prevent reciprocating movement of said carriage with respect to said support frame.

6. A seat assembly for a mobile vehicle and for rotatably and slideably supporting a seat, said assembly comprising:

a carriage for supporting said seat, said carriage including parallel shaft members;

a rigid, stationary and generally vertical shaft securable to said vehicle;

a support frame for slideably supporting said carriage for fore and aft movement, said support frame being rotatably supported by said vertical shaft, said support frame including a sleeve rotatably received on said generally vertical shaft, a horizontal bottom wall supported by said sleeve, a pair of opposed spaced apart upwardly extending walls supported by said bottom wall, and a pair of parallel spaced apart guide tubes supported by said upwardly extending walls, said guide tubes each supporting one of said parallel shaft members therein in slideable reciprocating movement whereby said carriage is slideably mounted on said frame for reciprocating movement relative thereto and between fore and aft positions, and further including latch means for selectively preventing rotational movement of said support frame with respect to said shaft and operably connected between said shaft and said support frame and a releasing member operably connected to and carried by said carriage for disengaging said latch means when said carriage is moved to said aft position thereby permitting rotational movement of said support frame after said carriage has been slid to said aft position, said latch means including a stationary latch member fixed to said vertical shaft and a shiftable latch member shiftably supported by said frame.

7. The seat assembly set forth in claim 6 wherein said shiftable latch member includes.

* * * * *

UNITED STATES PATENT AND TRADEMARK OFFICE
CERTIFICATE OF CORRECTION

PATENT NO. : 4,014,507
DATED : March 29, 1977
INVENTOR(S) : Richard F. Swenson

It is certified that error appears in the above-identified patent and that said Letters Patent are hereby corrected as shown below:

Claim 7, after "includes" conclude the claim by
inserting before the period (.) the following
---an elongated latch shaft positioned vertically
and a swingable member, said elongated shaft being
supported by said swingable member for swingable
movement about a vertical axis spaced from said
elongated latch shaft for engagement with said
stationary latch member ---

Signed and Sealed this

Twenty-fifth Day of September 1979

[SEAL]

Attest:

LUTRELLE F. PARKER
*Attesting Officer*   *Acting Commissioner of Patents and Trademarks*